United States Patent [19]

Saotome et al.

[11] Patent Number: 4,858,899
[45] Date of Patent: Aug. 22, 1989

[54] BUSHING TYPE VIBRATION INSULATOR

[75] Inventors: Masaru Saotome, Isehara; Takao Ushijima, Chigasaki; Takeshi Noguchi, Ichikawa; Naomi Sato; Tsutomu Nakao, both of Tokyo, all of Japan

[73] Assignees: Nissan Motor Co., Ltd.; Bridgestone Corporation, both of Japan

[21] Appl. No.: 923,483

[22] Filed: Oct. 27, 1986

[30] Foreign Application Priority Data

Oct. 28, 1985 [JP] Japan .................................. 60-239513
Oct. 28, 1985 [JP] Japan .................................. 60-239514

[51] Int. Cl.$^4$ ...................... F16M 7/00; F16M 13/00; B62D 21/11
[52] U.S. Cl. ................................. 267/219; 267/141.4; 180/312; 248/636
[58] Field of Search ............... 267/140.1, 140.2, 140.3, 267/140.4, 149.5, 141, 141.1, 141.2, 141.3, 141.4, 141.5, 141.6, 141.7, 35, 8 R, 57.1 R; 180/300, 312; 248/562, 636; 280/707

[56] References Cited

U.S. PATENT DOCUMENTS

| | | | |
|---|---|---|---|
| 2,417,096 | 3/1947 | Thiry | 267/140.1 |
| 2,841,354 | 7/1958 | Humble | 267/35 |
| 4,436,318 | 3/1984 | Ichikawa et al. | 280/707 X |
| 4,588,174 | 5/1986 | Konishi | 267/35 X |
| 4,600,215 | 7/1986 | Kuroki et al. | 280/707 |
| 4,630,806 | 12/1986 | Dan et al. | 267/140.1 |
| 4,650,042 | 3/1987 | Knecht et al. | 280/707 |
| 4,700,933 | 10/1987 | Chikamori et al. | 240/636 X |

FOREIGN PATENT DOCUMENTS

| | | | |
|---|---|---|---|
| 1067263 | 2/1957 | Fed. Rep. of Germany | 248/562 |
| 58-54247 | 3/1983 | Japan | 267/140.1 |
| 59-151637 | 8/1984 | Japan | 267/140.1 |
| 60-73146 | 4/1985 | Japan | 267/140.1 |
| 60-66507 | 5/1985 | Japan . | |
| 60-88242 | 5/1985 | Japan | 267/140.1 |
| 60-179542 | 9/1985 | Japan | 267/140.1 |
| 0698953 | 11/1953 | United Kingdom | 267/35 |

*Primary Examiner*—Andres Kashnikow
*Assistant Examiner*—Richard Potosnak
*Attorney, Agent, or Firm*—Leydig, Voit & Mayer

[57] ABSTRACT

A bushing type vibration insulator, for example, used as a suspension bushing of an automotive vehicle. The vibration insulator consists of an outer cylindrical member connected to one member of the suspension. The outer cylindrical member is connected through an elastomeric member with an inner cylindrical member which is connected to another member of the suspension. The inner and outer cylindrical members share a common central longitudinal axis. Two fluid chambers are formed between the outer cylindrical member and the elastomeric member and filled with a fluid. The fluid chambers are communicable through a communication passage formed through an actuator fixedly secured directly to the outer cylindrical member. The actuator is constructed and arranged to block fluid flow through the communication passage under a predetermined condition, thereby raising the spring constant of the vibration insulator.

26 Claims, 10 Drawing Sheets

BUSHING TYPE VIBRATION INSULATOR

BACKGROUND OF THE INVENTION

1. Field of the Invention

The present invention relates to a bushing type vibration insulator whose spring constant is changeable, usable as an engine mount, a cab mount, a body mount, a bushing or the like in an automotive vehicle.

2. Description of the Prior Art

For example, a bushing type vibration insulator to be used as a bushing of a suspension of an automotive vehicle requires a high spring constant for the purpose of improving driving stability of the vehicle. On the contrary, such a high spring constant of the bushing causes the vehicle to be uncomfortable to ride in when the vehicle runs on rough road, and additionally tends to provide so-called stuck state of road wheels so that the vehicle becomes difficult to get out of muddy road.

In view of this, a bushing type vibration insulator whose spring constant is variable has been proposed as disclosed, for example, in Japanese Utility Model Provisional Publication No. 60-66507. Such a vibration insulator consists of an elastic member disposed to connect an outer cylindrical member and an inner cylindrical member, the elastic member being made of an elastomeric material such as rubber. Two fluid chambers are formed between the outer and inner cylindrical members in such a manner as to be located in the diametrical direction of the cylindrical members. A part of each fluid chamber is defined by the elastic member. The fluid chambers are adapted to be simultaneously supplied with the fluid at a predetermined pressure by means of a pump and electromagnetic valves which are located remote from the two fluid chambers.

With such a bushing type vibration insulator, its spring constant is raised by increasing the fluid pressures of both the fluid chambers and lowered by decreasing the same fluid pressures. Thus, the vibration insulator improves vehicle comfortableness to drive in particularly during driving on rough road upon lowering the spring constant thereof, while sufficiently effectively preventing the stuck state of the wheels from occurrence.

However, since such a conventional bushing type vibration insulator is disposed remote from the hydraulic pump and the electromagnetic valves, fluid supply and discharge passages for fluidly connecting the vibration insulator and the pump are required to be considerably long. Accordingly, there is a high possibility of fluid leaking from the fluid supply and discharge passages while requiring a large space for installation of the vibration insulator and accessories therefor and extremely increasing the number of steps for production. Furthermore, it is required to provide a separate fluid tank for connecting the pump, the electromagnetic valves and the like.

In addition, because of the long fluid supply and discharge passages, a longer time is necessary to change over the rigidity value of the vibration insulator so as to be impossible to instantaneously change the characteristics of the vibration insulator. Furthermore, the dynamic spring constant of the vibration insulator cannot be suppressed to a lower value owing to line loss.

SUMMARY OF THE INVENTION

A bushing type vibration insulator of the present invention consists of an outer cylindrical member connected to a first member of a vibration system. The outer cylindrical member is connected through an elastic member with an inner cylindrical member which is disposed inside the outer cylindrical member sharing a common central longitudinal axis with the outer cylindrical member, and connected to a second member of the vibration system. At least two fluid chambers filled with a fluid are located between the outer and inner cylindrical members and defined by a part of the elastic member. The fluid chambers are communicated with each other through a communication passage which is closable by an actuator to block fluid communication between the fluid chambers under a predetermined condition.

Accordingly, when the actuator causes the communication passage to be opened to allow fluid flow between the fluid chambers, the spring constant of the vibration insulator is lowered to a desired low value. On the contrary, when actuator causes the communication passage to be closed to block fluid flow between the fluid chambers, the spring constant of the vibration insulator is increased to a desired high level.

Therefore, in case the vibration insulator is applied as a suspension bushing of an automotive vehicle, vehicle ride-in comfortableness during rough road cruising is greatly improved while effectively preventing stuck state of road wheels. Additionally, vehicle driving stability during high speed cruising can be sufficiently improved.

Furthermore, with this vibration insulator, the actuator may be installed directly to the inner or outer cylindrical member, and therefore the whole length of the communication passage is shortened. Consequently, space occupied by the vibration insulator and production steps of the vibration insulator are effectively reduced while removing possibility of leaking of the fluid through the communication passage. The shortened communication passage shortens a time required to change the spring constant of the vibration insulator while suppressing line loss to the minimum value thereby lowering the dynamic spring constant of the vibration insulator. Additionally, since fluid flow between the fluid chambers is controlled by the actuator, an oil pump and the space, production steps and cost therefore are not required.

BRIEF DESCRIPTION OF THE DRAWINGS

In the following figures, like reference numerals designate corresponding elements and parts for the purpose of simplicity of illustration.

DETAILED DESCRIPTION OF THE INVENTION

Figure 1A:
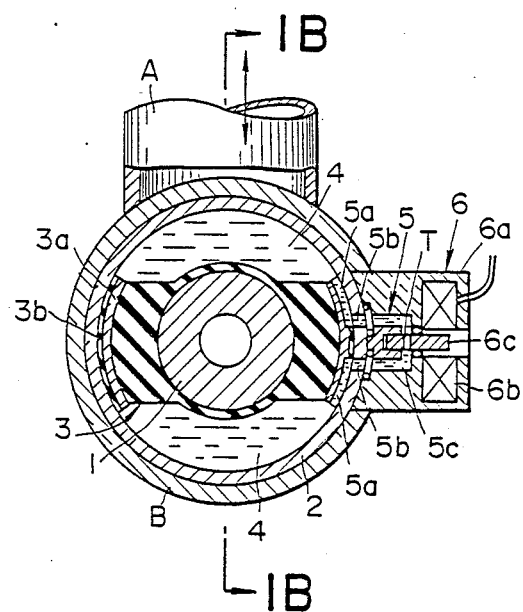
FIG. 1A is a vertical sectional view of a first embodiment of a bushing type vibration insulator according to the present invention.
Figure 1B:
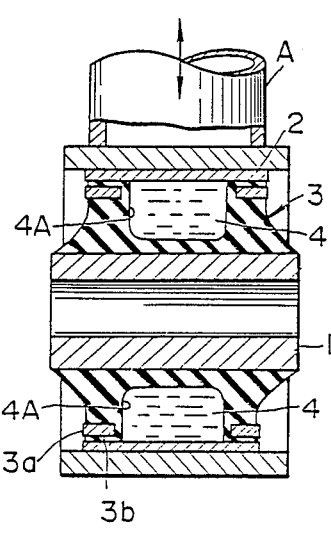
FIG. 1B is a sectional view taken in the direction of arrows substantially along the line 1B—1B.
Figure 1C:
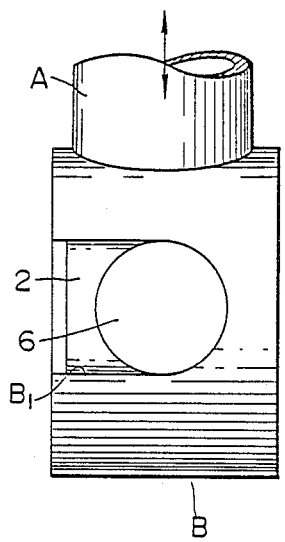
FIG. 1C is a side view of the vibration insulator of FIG. 1A.

Referring now to Figs. 1A to 1C, there is shown a first embodiment of a bushing type vibration insulator in accordance with the present invention. The bushing type vibration insulator of this embodiment is designed to be used in a suspension system or vibration system of an automotive vehicle, and comprises an inner cylindrical member 1 connected to one member of the vibration system, and an outer cylindrical member 2 connected to another member of the vibration system. The inner cylindrical member 1 is coaxially disposed inside the outer cylindrical member 2, in which an elastic member 3 is disposed between the inner and outer cylindrical members 1, 2 to elastically connect the inner and outer cylindrical members 1, 2. The elastic member 3 is made of an elastomeric material such as rubber. Two fluid chambers to be filled with a fluid are formed between the inner and outer cylindrical members 1, 2 and located opposite in the diametrical direction.

The elastic member 3 is generally cylindrical and extends along the axis of the vibration insulator. The inner surface of the elastic member 3 is securely connected to the outer surface of the inner cylindrical member 1, for example, by adhesion upon vulcanization in case the elastic member is made of rubber. The outer surface of the elastic member 3 is securely connected to the inner surface of the outer cylindrical member 2 by putting an outer peripheral section 3b of the elastic member 3 between the outer cylindrical member inner surface and an intermediate cylindrical member 3a which is embedded in the elastic member 3 at the section near the outer peripheral surface. The outer peripheral section of the elastic member 3 forms an elastic member lining layer 3b for providing a fluid-tight seal between the elastic member 3 and the outer cylindrical member 2. The outer cylindrical member 2 is caulked or radially inwardly pressed to be rigidly connected with the intermediate cylindrical member 3a. The intermediate cylindrical member 3a is formed with two openings having the shape corresponding to the peripheral profile of each fluid chamber 4. The elastic member 3 is formed with two arcuate grooves at its central section in the axial direction. The two arcuate grooves 4A, 4A are located symmetrical with respect to a plane (not shown) containing an axis of the inner cylindrical member 1. Each groove 4A is opened upwardly to form an arcuate opening in the outer surface of the elastic member 3, so that the fluid chamber 4 is formed within each arcuate grooves 4A. Accordingly, the fluid chamber 4 is defined between the elastic member 3 and the outer cylindrical member 2. More specifically, the arcuate outer periphery of the fluid chamber 4 is defined by the inner surface of the outer cylindrical member; and the arcuate bottom and the opposite sides of the same fluid chamber 4 are defined by the bottom wall and the side walls of the groove 4A, thus maintaining secure fluid-tight seal of the fluid chambers 4, 4.

In this embodiment, the two fluid chambers 4, 4 are communicable with each other through a communication passage 5 which is adapted to be closable by means of an actuator 6 installed to the outer cylindrical member 2. The communication passage 5 includes first portions 5a, 5a which are formed between the outer cylindrical member 2 and the intermediate cylindrical member 3a. Each first portion 5a extends along the inner periphery of the outer cylindrical member 2, and has one end opened to the fluid chamber 4 and the other end communicated with a second portion 5b which is formed through the wall of the outer cylindrical member 2. The second portion 5b is communicated with a generally C-shaped third portion 5c which is formed in the body 6a of the actuator 6. The actuator body 6a is fixedly secured to the outer cylindrical member 2, for example, by welding. The actuator 6 has a spool 6c which is adapted to be driven to move forward (left in FIG. 1A) and backward (rightward in FIG. 1A) under the action of a solenoid coil 6b. The spool 6c is formed with a through-opening T which can be coincident or aligned with the third portion 5c of the communication passage 5 when the spool 6c is moved forward to take a position as indicated in FIG. 1A, so that the third portion 5c is put into its open state thereby to establish communication between the two fluid chambers 4, 4. It will be understood that the third portion 5c is put into its closed condition thereby to block communication between the two fluid chambers 4, 4 when the spool 6c is moved backward so that the through-opening T puts out of the position coincident with the third portion 5c. As shown, a fluid-tight seal is maintained between the second portions 5b and the third portion 5c of the communication passage 5 by means of O-rings disposed between the outer cylindrical member 2 and the actuator body 6a, thus preventing fluid leak from the connecting section of the first and second portions 5b, 5c.

The thus arranged bushing type vibration insulator is installed to the vibration system as follows: For example, the outer cylindrical member 2 is fitted into and fixed within a cylindrical bracket B provided at an end of a rod A connected to one member of the vibration system. Additionally, another member of the vibration system is connected to the inner cylindrical member 1. In case where the actuator 6 has been previously installed to the outer cylindrical member 2 as discussed above, the body 6a of the actuator 6 is pushed into a cut-out portion $B_1$ of the cylindrical bracket B along the axis of the cut-out portion $B_1$. The cut-out portion $B_1$ extends from one end thereof to the vicinity of the other end in the axial direction of the cylindrical bracket B. Thus, the actuator 6 is located in position in the state where a major part of the actuator 6 projects over the outer peripheral surface of the cylindrical bracket B.

In addition, in case where the cylindrical bracket B is so designed that the actuator 6 is fixed in position by means of, for example, press-fit or caulking, the actuator 6 is fixed to the cylindrical bracket B after the outer cylindrical member 2 is fitted into and fixed within the cylindrical bracket B, thereby enabling suitable formation of the communication passage 5.

The manner of operation of the thus installed bushing type vibration insulator will be discussed hereinafter.

In the state where the spool 6c of the actuator 6 is moved forward to take the forward position as shown in FIG. 1A so that the communication passage 5 is opened to establish fluid communication between the two fluid chambers 4, 4, when upward and downward vibration as indicated by a two-headed arrow in FIGS. 1A to 1C is transmitted to the vibration insulator, the two fluid chambers 4, 4 alternately receive external forces in their compression and expansion directions so that the fluid within the fluid chambers 4, 4 flows from the high pressure side fluid chamber 4 through the communication passage 5 to the low pressure side fluid chamber 4. This causes the spring constant of the vibration insulator to be suppressed to a sufficiently low level.

In the state where the spool 6c is moved backward to take the backward position so that the communication passage 5 is closed to block the fluid communication between the two fluid chambers 4, 4, even when the upward and downward vibration is transmitted to the vibration insulator so that external forces in the compression and expansion directions alternatively act on the fluid chambers 4, 4, the fluid flow between the two fluid chambers 4, 4 is completely prevented, thus raising the spring constant of the vibration insulator to a sufficiently high level.

Accordingly, in case where the bushing type vibration insulator is used as a bushing of a suspension of an automotive vehicle, driving stability of the vehicle during high speed cruising is sufficiently improved upon closing the communication passage 5. On the contrary, ride-in comfortableness of the vehicle during rough road cruising is improved while effectively preventing the stuck state of the road wheels of the vehicle upon opening the communication passage 5.

Figure 2:
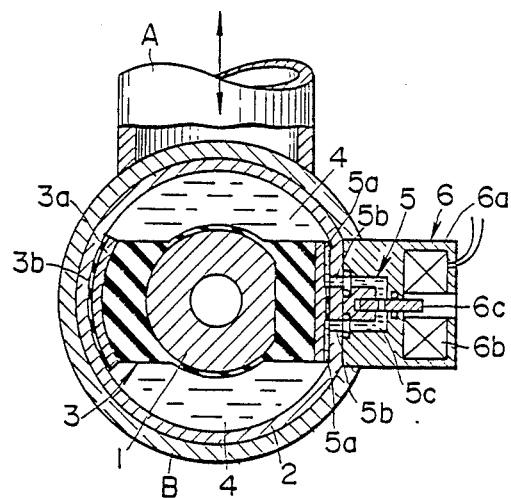
FIG. 2 is a vertical sectional view similar to FIG. 1A but showing a second embodiment of a bushing type vibration insulator according to the present invention.

FIG. 2 illustrates a second embodiment of the bushing type vibration insulator which is similar to the first embodiment of FIGS. 1A to 1C except for the shape of a section in which the communication passage 5 is formed. Also in this embodiment, the cylindrical bracket B is so designed that the actuator 6 is fixed in position by means of, for example, press-fit or caulking, in which the actuator 6 is fixed to the cylindrical bracket after the outer cylindrical member 2 is fitted into and fixed within the cylindrical bracket B, thereby enabling suitable formation of the communication passage 5. In this connection, the outer cylindrical member 2 and the intermediate cylindrical member 3a are flattened, for example, by squeezing or the like machining, in which fixing of the actuator 6 to the bracket B upon threading-into or the like after the outer cylindrical member 2 being fixed within the cylindrical bracket B is largely facilitated. Additionally, the fluid-tight seal between the outer cylindrical member and the actuator 6 is improved. These are the same as in case where the actuator 6 is directly fixed to the surface of the outer cylindrical member 2.

Figure 3:
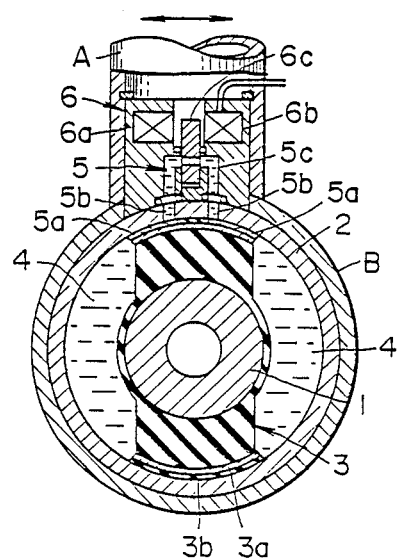
FIG. 3 is a vertical sectional view similar to FIG. 1A but showing a third embodiment of a bushing type vibration insulator according to the present invention.

FIG. 3 illustrates a third embodiment of the bushing type vibration insulator according to the present invention, which is similar to the first embodiment of FIGS. 1A to 1C with the exception that the installation posture of the vibration insulator is shifted an angle of 90 degrees in which the actuator 6 is housed in the rod A. In this embodiment, the spring constant of the vibration insulator can be controlled to take high and low values against horizontal vibration as indicated by a two-headed arrow. Additionally, the actuator 6 is prevented from projecting over the cylindrical bracket B thereby effectively reducing a space occupied by the vibration insulator.

Figure 4A:
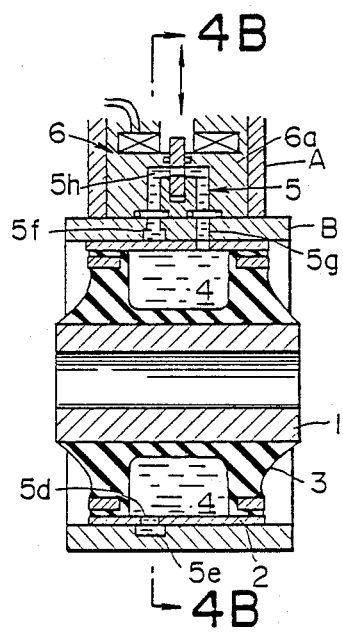
FIG. 4A is a sectional view similar to FIG. 1B but showing a fourth embodiment of a bushing type vibration insulator according to the present invention.
Figure 4B:
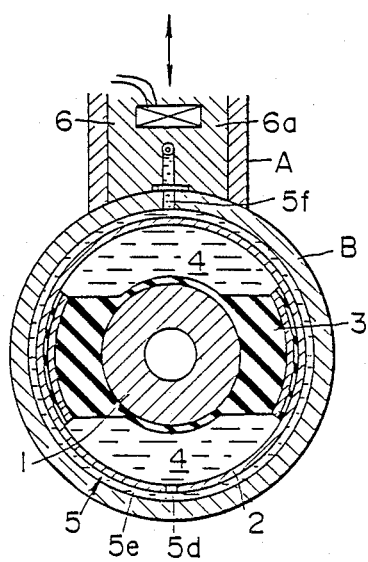
FIG. 4B is a sectional view taken in the direction substantially along the line 4B—4B of FIG. 4A.

FIGS. 4A and 4B illustrate a fourth embodiment of the bushing type vibration insulator according to the present invention, which is similar to the first embodiment of FIGS. 1A to 1C with the exception that the actuator 6 is housed in the rod A in order to be intended to exhibit vibration insulation effect against upward and downward (in the drawing) vibration as indicated by a two-headed arrow. In this embodiment, the outer cylindrical member 2 is formed at its portion defining the lower fluid chamber 4 with a through-hole 5d which is communicated with an annular first passage portion 5e which is formed on the inner peripheral surface of the cylindrical bracket B and extends annularly along the inner periphery of the bracket B. The first passage portion forms part of the communication passage 5. The cylindrical bracket B is further formed with a through-hole 5f which merges with the first passage portion 5e and located at a position opposite to the through-hole 5d in the diametrical direction of the cylindrical bracket B. A further through-hole 5g passing through the cylindrical bracket B and the outer cylindrical member 2 is provided to be communicated with the upper fluid chamber 4. A generally C-shaped second passage portion 5h is formed in the body 6a of the actuator 6. The second passage portion 5h corresponds to the second passage portion 5c of FIG. 1A, in which the spool 6c is movably disposed so that its through-opening T can be coincident or aligned with the second passage portion 5h to establish fluid communication between the two fluid chambers 4, 4 through the communication passage 5. It will be understood that the structure and the operation of the actuator 6 is the same as in the first embodiment of FIG. 1A.

With this arrangement of the fourth embodiment, the spring constant of the vibration insulator can be controlled to take high and low values against upward and downward (in the drawing) vibration as indicated by a two-headed arrow, while effectively reducing the space occupied by the vibration insulator like in the third embodiment.

Figure 5:
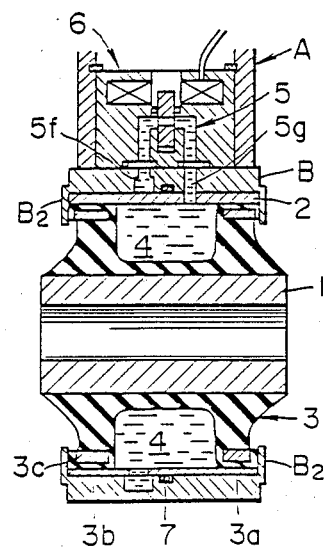
FIG. 5 is a sectional view similar to FIG. 1B but showing a fifth embodiment of a bushing type vibration insulator according to the present invention.

FIG. 5 illustrates a fifth embodiment of the bushing type vibration insulator according to the present invention, which is similar to the fourth embodiment of FIGS. 4A and 4B except for provision of means for improving fluid-tight seal in the vibration insulator. In this embodiment, an O-ring 7 is disposed within an annular groove (no numeral) formed on the inner peripheral surface of the cylindrical bracket B and located between the two through-holes 5d, 5g, thus securely preventing the fluid communication between the two through-holes 5f, 5g.

In addition, in this embodiment, the elastic member 3 has a sealing layer 3c contiguous to the lining layer 3b. The sealing layer 3c is securely put between the outer side of the intermediate cylindrical member 3a and an annular end portion B₂ of the cylindrical bracket B. The annular end portion B₂ has been formed by caulking or bending the end portion of the cylindrical bracket B. This structure effectively prevents the fluid from leaking from a section formed with the communication passage 5 toward the outside in the axial direction. It will be understood that the sealing layer 3c may be replaced with an O-ring which is located on the inner peripheral surface and at axial direction end section of the cylindrical bracket B in such a manner as to surround the outer cylindrical member 2.

Furthermore, a sealing material (not shown) may be provided between the cylindrical bracket B and the outer cylindrical member 2 in such a manner as not to obstruct the fluid communication through the communication passage 5 including the through-holes 5d, 5f, 5g and the first passage portion 5e, thereby preventing fluid communication between the through-holes 5f, 5g while preventing fluid leaking from the section formed with the communication passage 5 toward the outside in the axial direction.

Figure 6:
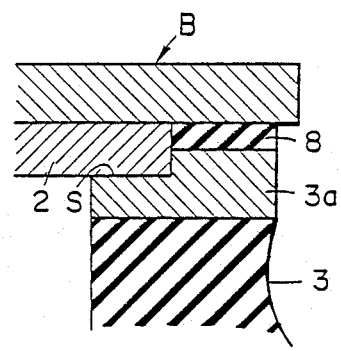
FIG. 6 is a sectional view of an essential part of a sixth embodiment of a bushing type vibration insulator according to the present invention.

FIG. 6 illustrates a part of a sixth embodiment of the bushing type vibration insulator of the present invention, similar to the first embodiment except for a sealing structure between the elastic member 3 and the outer cylindrical member 2 and between the outer cylindrical member 2 and the cylindrical bracket B. In this embodiment, the outer cylindrical member 2 having a whole length larger than that of the intermediate cylindrical member 3a is fixedly secured onto a small diameter section S of the intermediate cylindrical member 3a, for example, by caulking. The outer cylindrical member 2 is press-fitted into the cylindrical bracket B having a whole length similar to that of the intermediate cylindrical member 3a so that a sealing material 8 disposed between the cylindrical bracket B and the intermediate cylindrical member 3a is compressed to deform. Thus, the sealing material 8 functions to securely prevent the fluid in the fluid chamber 4 from leaking through between the elastic member 3 and the outer cylindrical member 2 and through between the outer cylindrical member 2 and the cylindrical bracket B.

Figure 7A:
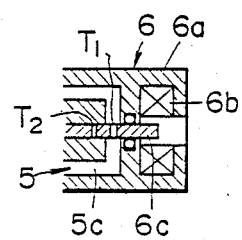
FIG. 7A is a sectional view of an essential part of a seventh embodiment of a bushing type vibration insulator according to the present invention, showing an operational state of the vibration insulator.
Figure 7B:
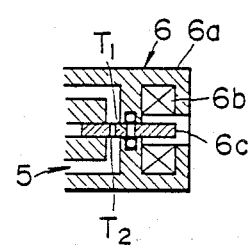
FIG. 7B is a sectional view similar to FIG. 7A but showing another operational state of the vibration of FIG. 7A.

FIGS. 7A and 7B illustrate a part of a seventh embodiment of the bushing type vibration insulator of the present invention, similar to the first embodiment of FIG. 1 except for the structure and operation of the actuator 6. In this embodiment, the spool 6c is formed with first and second through-openings $T_1$, $T_2$. The first through-opening $T_1$ is larger in cross-section than the second through-opening $T_2$. The actuator 6 is adapted to move axially multi-stepwise so that each of the first and second through-openings $T_1$, $T_2$ can be coincident or aligned with the passage portion 5c of the communication passage 5.

With this arrangement, when the first through-opening $T_1$ is coincident or communicated with the passage portion 5c, the vibration insulator takes a value of spring constant particularly suitable for insulation of relatively high frequency vibration. When the second through-opening $T_2$ is coincident or communicated with the passage portion 5c, the vibration insulator takes another spring constant value particularly suitable for insulation of relatively low frequency vibration. It will be understood that the structure of the actuator 6 in FIGS. 7A and 7B can be applied not only to the first embodiment but also to all the embodiments.

Figure 8:
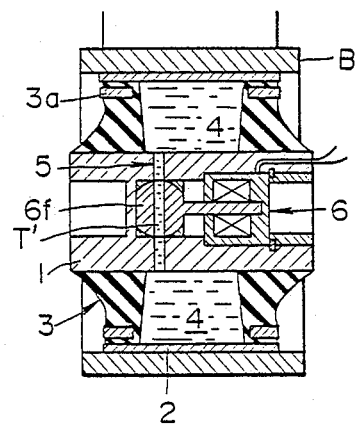
FIG. 8 is a sectional view similar to FIG. 1B but showing an eighth embodiment of a bushing type vibration insulator according to the present invention.

FIG. 8 illustrates an eighth embodiment of the bushing type vibration insulator according to the present invention, which is similar to the first embodiment of FIG. 1B with the exception that the communication passage 5 for communicating the two fluid chambers 4, 4 is formed through the inner cylindrical member 1, and the actuator 6 is housed in the inner cylindrical member 1. In this embodiment, a spool 6f of the actuator 6 is of the rotatable type and driven to rotate, for example, by a DC motor or a stepping motor which forms part of the actuator 6. As shown, the spool 6f is formed with a through-opening T' which can be coincident or aligned with the communication passage 5 to establish fluid communication between the two fluid chambers 4, 4 as shown in FIG. 8. It will be understood that the communication passage T' is closed when the spool 6f is rotated from the position as indicated in FIG. 8. This arrangement greatly contributes to making the vibration insulator small-sized.

Now, in case where high frequency vibration (for example, of frequency not lower than 100 Hz) is transmitted to each of the above-discussed various bushing type vibration insulators, flowing movement of the fluid within the communication passage 5 becomes difficult with increase in vibration frequency owing to flow resistance of the communication passage 5 even in the open state of the communication passage 5. This at last leads to a state where the fluid cannot flow at all like in case of the communication passage 5 being closed.

In view of the above, in order to prevent such a phenomenon, it is necessary to enlarge the diameter of the communication passage 5 and to shorten the whole length of the same passage 5. For example, with respect to the vibration insulator as shown in FIGS. 1A to 1C, the diameter of the communication passage 5 is required to be not less than 10 mm in case where a rubber material, a so-called "effective pressure receiving area" and a so-called "volume elasticity" are decided to meet the following requirements: static spring constant in the open state of the communication passage 5 is 30 Kg/mm, and static spring constant in the closed state of the same passage 5 is 100 Kg/mm. Such a large diameter communication passage 5 is difficult to be put into practical use. Here, meant by the "effective pressure receiving area" is a area which is obtained by dividing the volume of the fluid flowing through the communication passage 5 at the time when the inner and outer cylindrical members 1, 2 make a relative displacement of 1 mm in the radial direction, by the relative displacement of 1 mm. Meant by the "volume elasticity" is a ratio P/V (Kg/cm⁵) between an inner pressure P of the fluid chamber 4 and a volume of the charged or discharged fluid required to change the inner pressure by 1 kgf/cm².

Figures 9A, 9B:
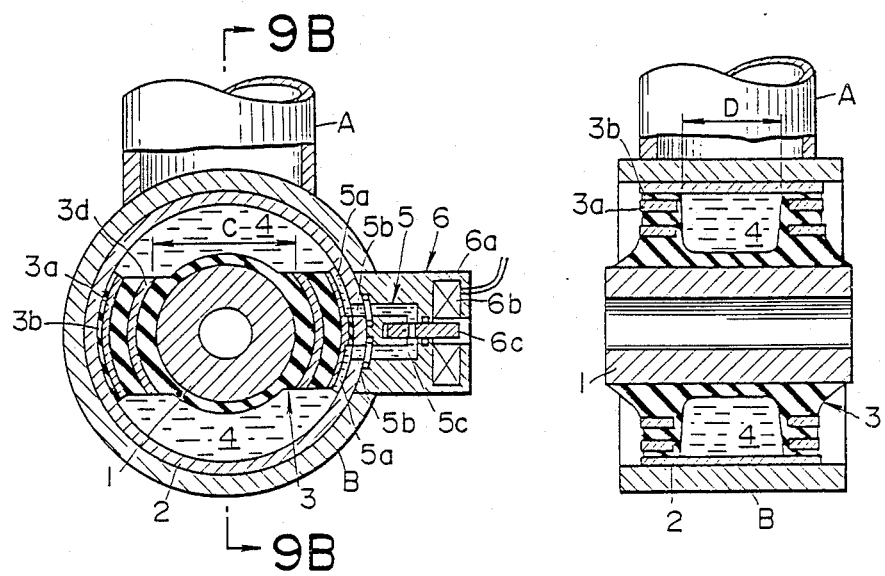
FIG. 9A is a vertical sectional view similar to FIG. 1A but showing a ninth embodiment of a bushing type vibration insulator according to the present invention.
FIG. 9B is a sectional view taken in the direction of arrows substantially along the line 9B—9B of FIG. 9A.

In this regard, for example, a ninth embodiment of the bushing type vibration insulator as shown in FIGS. 9A and 9B has been devised for the purpose of enabling a sufficient reduction of the diameter of the communication passage 5. In this embodiment, a reinforcement ring 3d made of a rigid material such as metal is embedded in the elastic member 3 and located between the inner cylindrical member 1 and the intermediate cylindrical member 3a. The reinforcement ring 3d has a shape similar to the intermediate cylindrical member 3a and has an outer diameter smaller than the inner diameter of the intermediate cylindrical member 3a. The reinforcement ring 3d raises the rigidity of the elastic member 3, thereby increasing the "volume elasticity" of the vibration insulator.

In case where the vibration insulator of FIGS. 9A and 9B is constructed and arranged to have an "effective pressure receiving area ("C"×"D")" is 11 cm² and a "volume elasticity" of 35 Kg/cm⁵, the limit diameter of the communication passage 5 to disable the fluid flow through the communication passage 5 at all upon receiving high frequency vibration not lower than 100 Hz is lowered to about 4 mm. Therefore, the blocking phenomena of the communication passage 5 can be securely avoided by making the diameter of the communication passage 5 about 5 mm. It will be understood that it is sufficiently possible to form the communication passage 5 having such a diameter.

Figure 10A:
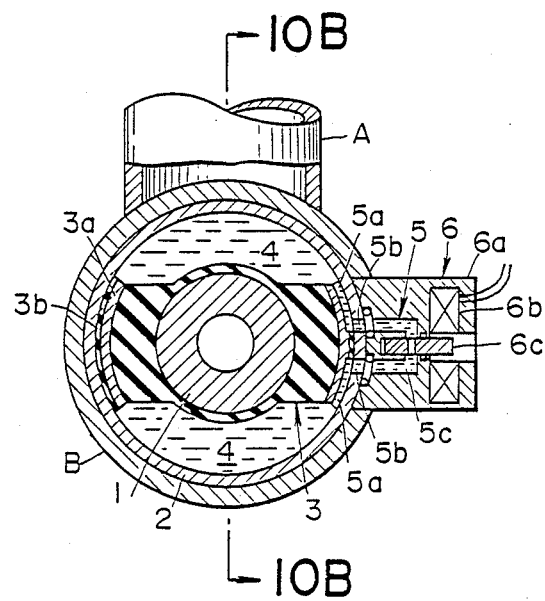
FIG. 10A is a vertical sectional view similar to FIG. 1A but showing a tenth embodiment of a bushing type vibration insulator according to the present invention.
Figure 10B:
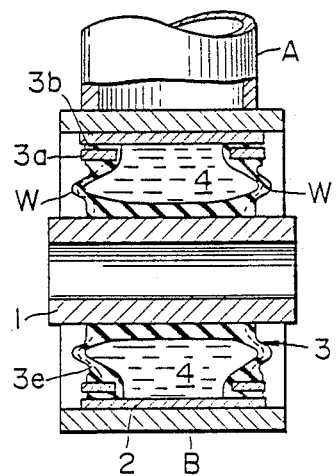
FIG. 10B is a sectional view taken in the direction substantially along the line of 10B—10B.

FIGS. 10A and 10B illustrate a tenth embodiment of the bushing type vibration insulator according to the present invention, similar to the ninth embodiment of FIGS. 9A, 9B. In this embodiment, the opposite end walls W, W, defining thereinside the fluid chamber 4, of the elastic member 3 are formed into the shape of a diaphragm. Additionally, reinforcement cords 3e are embedded in each of the end walls W. The reinforcement cords 3e raises the volume elasticity of the vibration insulator. With this arrangement, it is possible to make the diameter of the communication passage 5 sufficiently small without using the relatively heavy reinforcement ring 3d as shown in FIGS. 9A, 9B, thus achieving to make the vibration insulator lighter in weight.

Figure 11:
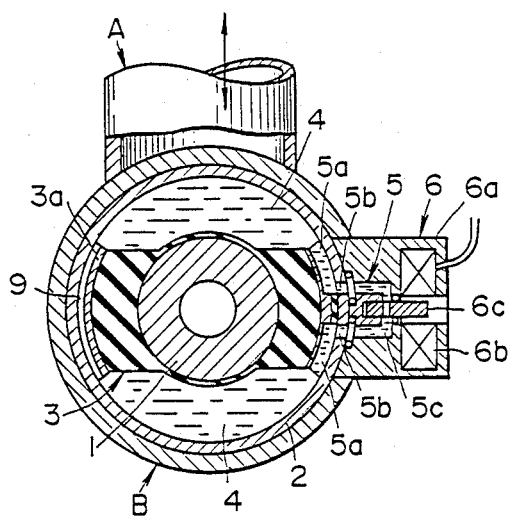
FIG. 11 is a vertical sectional view similar to FIG. 1 but showing an eleventh embodiment of a bushing type vibration insulator according to the present invention.
Figure 12:
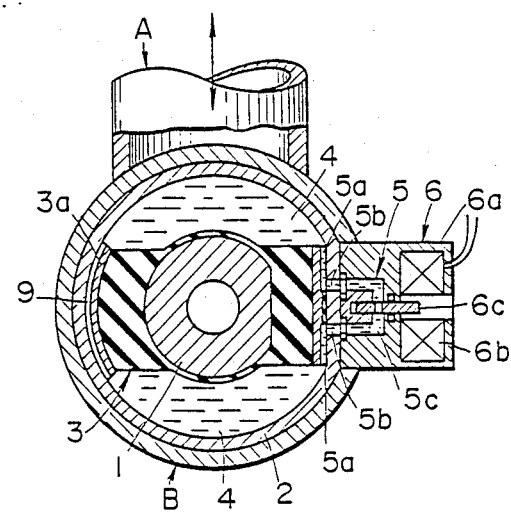
FIGS. 12, 13, 14, 15 and 16 are sectional views similar to those of FIGS. 2, 3, 4B, 9B and 10A, respectively, but showing modified examples of the eleventh embodiment of FIG. 11.
Figure 13:
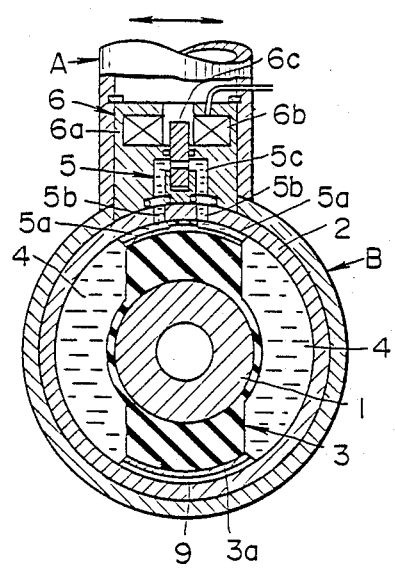
Figure 14:
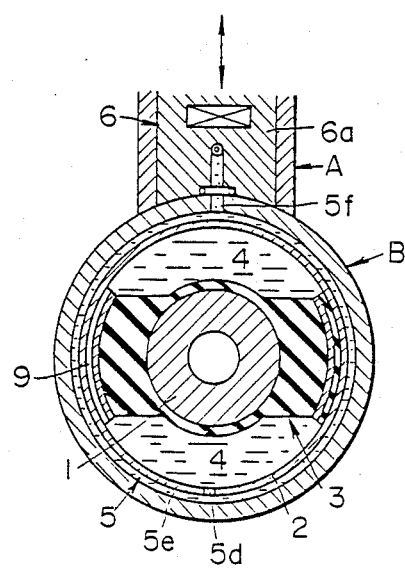
Figure 15:
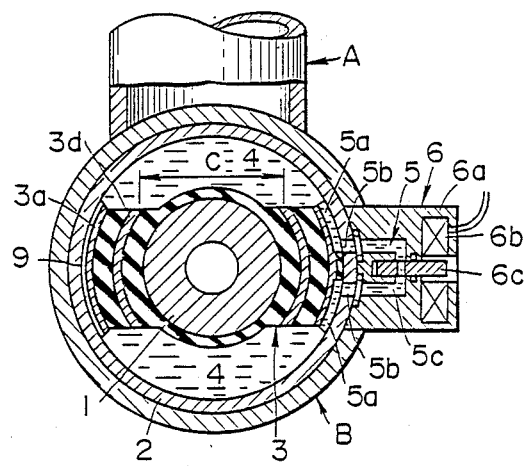

FIG. 11 illustrates an eleventh embodiment of the bushing type vibration insulator according to the present invention, similar to the first embodiment of FIGS. 1A to 1C except for provision of a narrow communication passage 9 to establish fluid communication between the two fluid chambers 4, 4 in addition to the communication passage 5. The narrow communication passage 9 is smaller in cross-sectional area than the communication passage 5. In this embodiment, the narrow communication passage 9 is formed to be defined by a groove formed on the outer peripheral surface of the intermediate cylindrical member 3a and the inner peripheral surface of the outer cylindrical member 2 upon cutting off a part of the lining layer 3b. Otherwise, the communication passage 9 may be defined by the outer peripheral surface of the intermediate cylindrical member 3a and the lining layer 3b. The narrow communication passage 9 has one end opened to one of the fluid chambers 4, 4 and the other end opened to the other fluid chamber 4 to allow fluid to flow between the two chambers 4, 4. The narrow communication passage 9 may be formed by a groove formed on the inner peripheral surface of the outer cylindrical member 2 and the outer peripheral surface of the intermediate cylindrical member 3a. It will be understood that the narrow communication passage 9 may be formed through the inner cylindrical member 1 or the elastic member 3 in such a manner as to establish fluid communication between the two fluid chambers 4, 4.

With this arrangement, when no vibration is transmitted to the inner or outer cylindrical member 1, 2 or when vibration transmitted thereto has a frequency lower than a predetermined level, the fluid can flow through the small diameter communication passage 9. In other words, when the vibration transmitted to the inner or outer cylindrical member 1, 2 has a frequency higher than the predetermined level, the narrow communication passage 9 is put into a blocked state mainly owing to the flowing resistance thereof to the fluid passing therethrough, so that the fluid cannot flow through the narrow communication passage 9.

In case where the communication passage 5 is closed by the spool 6c under a condition in which no relative displacement is made between the inner and outer cylindrical members 1, 2, the flowing movement of the fluid between the fluid chambers 4, 4 is prevented; however, the geometrical disposition of a vibration system (for example, a suspension link of an automotive vehicle) to which the vibration insulator is installed is not changed, because the inner and outer cylindrical members 1, 2 are disposed coaxial with each other.

In case where the inner and outer cylindrical members 1, 2 make a relative displacement during closing of the communication passage 5, the geometrical disposition of the automotive vehicle suspension link is changed; however, the fluid is allowed to flow through the narrow communication passage 9, for example, under the state where the frequency of the vibration transmitted to the vibration insulator becomes lower than the predetermined level, so that the inner pressures of the two fluid chambers gradually become equal. This gradually minimizes the relative displacement to obtain a coaxial state of the inner and outer cylindrical members 1, 2. When the inner and outer cylindrical members 1, 2 are put into the coaxial state, the geometrical disposition of the suspension link is restored to an initial state. Thus, in any cases, the vibration insulator can provide the driving stability of the vehicle.

It will be appreciated that the narrow communication passage 9 may be provided to establish the fluid communication between the two fluid chambers 4, 4 in each of the second, third, fourth, ninth and tenth embodiments as shown respectively in FIGS. 12, 13, 14, 15 and 16. It will be understood that the other embodiments respectively shown in FIGS. 5, 6, 7A (7B), 8 may be also provided with the narrow communication passage 9 though not shown.

Figure 17:
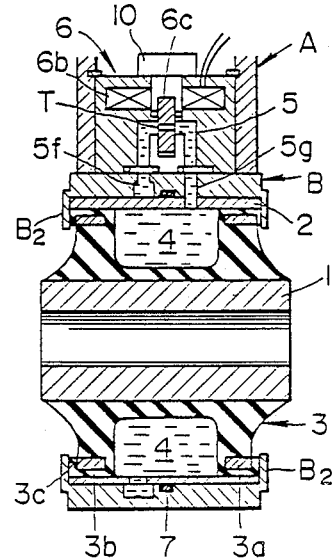
FIG. 17 is a sectional view similar to FIG. 5 but showing a twelfth embodiment of a bushing type vibration insulator according to the present invention.
Figure 16:
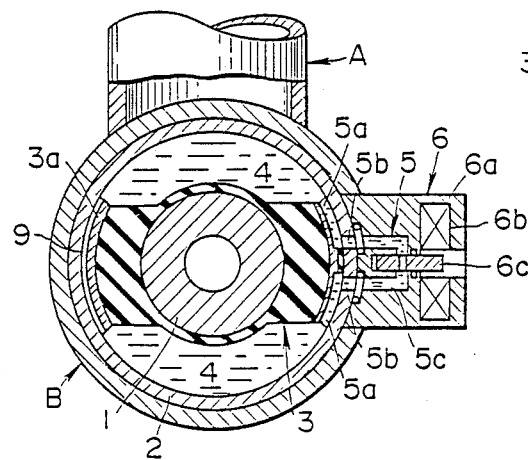

FIG. 17 illustrates a twelfth embodiment of the vibration insulator according to the present invention, similar to the fifth embodiment of FIG. 5. In this embodiment, the two fluid chambers 4, 4 are communicable with each other only through the communication passage 5 without using the narrow communication passage 9 shown in FIG. 11. A displacement sensor 10 is fixedly secured on the surface of the actuator 6 housed in the rod A so that the displacement sensor 10 is indirectly connected or installed to the outer cylindrical member 2. The displacement sensor 10 includes a detecting section for detecting photoelectrically or magnetically the amount of the relative displacement between the inner and outer cylindrical members 1, 2. The displacement sensor 10 further includes a comparator section for deciding whether or not the relative displacement detected by the detecting section is within an allowable range. The displacement sensor further includes an output section for providing to the actuator 6 a command to close the communication passage 5 when the comparator section decides that the relative displacement is within the allowable range. More specifically, when the output section provides the command to the actuator, a command signal is supplied to the solenoid coil 6b of the actuator 6 thereby to move the spool 6b in such a manner as to block the fluid communication between the two fluid chambers 4, 4.

While the detecting, comparator and output sections of the displacement sensor 10 have been shown and described as being incorporated as a one-piece structure, it will be appreciated that only the detecting section may be fixedly secured to the actuator 6 and located separate from the other sections of the displacement sensor 10, which can provide the same desired effect as in the arrangement in FIG. 17.

It will be understood that the displacement sensor 10 is housed together with the actuator 6 within the rod A thereby to omit an outside space occupied by the displacement sensor 10. It will be appreciated that the displacement sensor 10 may be installed directly or indirectly to the outer cylindrical member 2 or to the cylindrical bracket B. Furthermore, in case of a vibration system where vibration is transmitted to the side of the inner cylindrical member 1 while the outer cylindrical member 2 serves as a fixed side member, the displacement sensor 10 may be directly or indirectly fixed to the inside of a through-hole or to other section of the inner cylindrical member 1.

Figure 18:
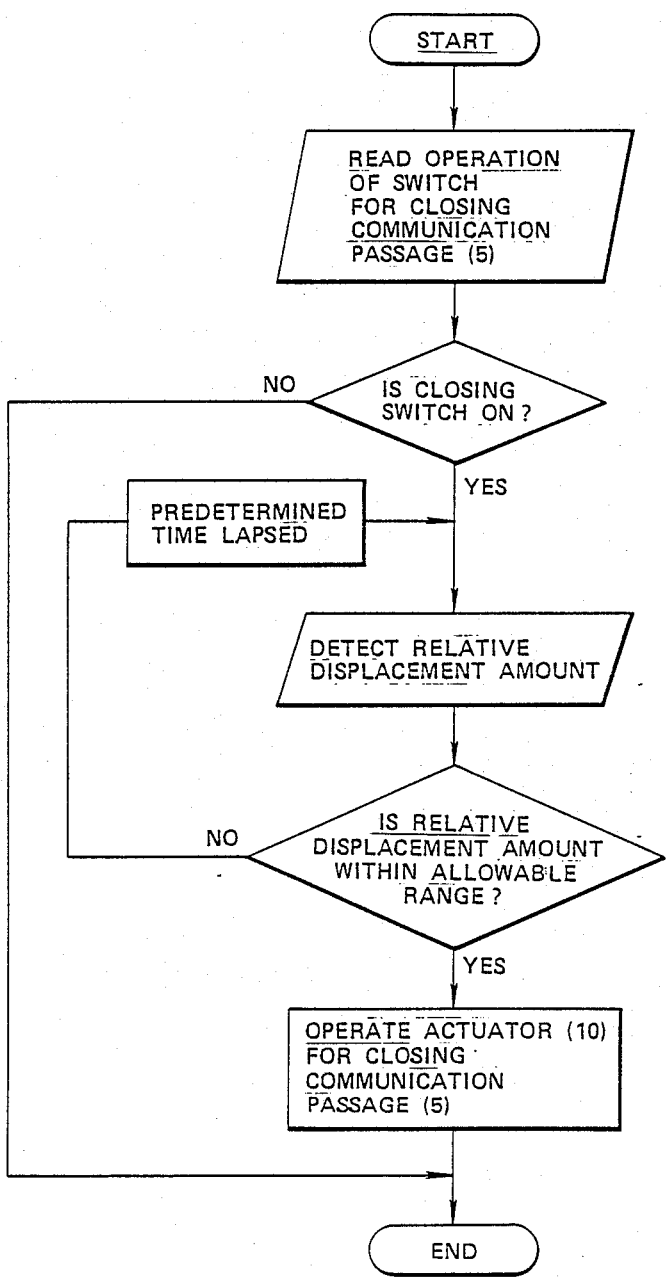
FIG. 18 is a flowchart showing a process of operation of a displacement sensor used in the vibration insulator of FIG. 17.

With the thus arranged vibration insulator, in order to select a relatively high spring constant, as shown in a flowchart of FIG. 18, the operation of a relay circuit for controlling the vibration insulator is started, while turning ON a switch for closing the communication passage 5. This accomplishes successive detection of the relative displacement amount between the inner and outer cylindrical members 1, 2 in the detecting section of the displacement sensor 10 and comparison of the detected relative displacement amount with the allowable range in the comparator section of the displacement sensor 10. When the detected relative displacement amount is within the allowable range, the command for closing the communication passage 5 is output from the output section of the displacement sensor 10 thereby to close the communication passage 5. When the detected relative displacement amount is outside the allowable range, the above-mentioned detection and comparison are repeated periodically, for example at intervals of several seconds. The communication passage 5 is closed when the detected relative displacement amount becomes within the allowable range.

Accordingly, in case where this vibration insulator is used for a suspension bushing of an automotive vehicle, running stability of the vehicle is securely maintained because the geometrical disposition of a suspension link is hardly changed or not changed at all during closing of the communication passage 5.

While the displacement sensor 10 and an arrangement for closing the communication passage 5 have been shown and described as being applied to the fifth embodiment of FIG. 5 and in connection with the twelfth embodiment of FIG. 17, it will be understood that the displacement sensor 10 and the arrangement may be applied to other embodiments such as the first, second, third, fourth, sixth, seventh, eighth, ninth and tenth embodiments respectively shown in FIGS. 1A (1B, 1C), 2, 3, 4A (4B), 6, 7A (7B), 8, 9A (9B), and 10A (10B), thereby sufficiently removing the relative displacement between the inner and outer cylindrical members 1, 2 during closing of the communication passage 5 without using the narrow communication passage 9.

Although only the two fluid chambers 4, 4 have been shown and described in all the embodiments, it will be understood that three or more fluid chambers 4, 4 may be formed in the bushing type vibration insulator of each embodiment. Further, the intermediate cylindrical member 3a may consists of two separate rings which are embedded in the opposite end sections of the elastic member 3 in the direction of length. Furthermore, the spool 6c of the actuator 6 in the embodiments other than the eighth embodiment may be replaced with a rotatable-type spool (for example, indicated at 6f in FIG. 8) driven by a stepping motor or a DC motor.

What is claimed is:

1. A bushing type vibration insulator which insulates vibrations in an automotive vehicle, comprising:
   an outer cylindrical member;
   an inner cylindrical member disposed inside and spaced from said outer cylindrical member;
   said inner and outer cylindrical members sharing a common central longitudinal axis;
   an elastic member disposed between said outer and inner cylindrical members to connect said outer and inner cylindrical members;
   means defining at least two fluid chambers filled with a fluid, said fluid chambers being located between said outer and inner cylindrical members and separate from each other in peripheral direction of said outer and inner cylindrical members, said fluid chambers defining means including a part of said elastic member;
   means defining a first communication passage for providing fluid communication between said fluid chambers;
   an electrically operated actuator constructed and arranged to close said first communication passage to block fluid communication between said fluid chambers under a predetermined condition, said actuator being fixedly secured directly to said outer cylindrical member.

2. A bushing type vibration insulator as claimed in claim 1, wherein said elastic member is formed with at least two grooves which respectively define therein said fluid chambers, each groove being sealingly covered with inner peripheral surface of said outer cylindrical member.

3. A bushing type vibration insulator as claimed in claim 1, further comprising an intermediate cylindrical member disposed between said outer and inner cylindrical members, wherein said elastic member is securely connected to said intermediate cylindrical member which is securely connected to said outer cylindrical member.

4. A bushing type vibration insulator as claimed in claim 3, wherein a major part of said intermediate cylindrical member is embedded in said elastic member and located near said outer cylindrical member, wherein a thin layer of said elastic member is located between said intermediate and outer cylindrical members.

5. A bushing type vibration insulator as claimed in claim 1, wherein said actuator includes a body in which a first portion of said communication passage is formed, said body being fixedly secured to a part of said vibration insulator, and a spool constructed and arranged to close said part of said first communication passage in response to said predetermined condition.

6. A bushing type vibration insulator as claimed in claim 1, further comprising means for allowing the fluid to flow through said first communication passage even under a condition where vibration having frequency higher than a predetermined level is transmitted to said vibration insulator, said fluid flow allowing means including means for increasing rigidity of said elastic member.

7. A bushing type vibration insulator as claimed in claim 6, further comprising an intermediate cylindrical member disposed between said outer and inner cylindrical members, wherein said elastic member rigidity increasing means includes a reinforcement ring embedded in said elastic member and located between said inner cylindrical member and said intermediate cylindrical member, said reinforcement ring being generally coaxial with said inner cylindrical member.

8. A bushing type vibration insulator as claimed in claim 6, wherein said elastic member has opposite end sections in axial direction, said opposite end sections defining therebetween one of said fluid chambers and formed into the shape of a diaphragm, wherein said elastic member rigidity increasing means includes reinforcement cords embedded in each of said opposite end sections of said elastic member.

9. A bushing type vibration insulator as claimed in claim 1, further comprising means for reducing amount of relative displacement between said outer and inner cylindrical members even under said predetermined condition.

10. A bushing type vibration insulator as claimed in claim 9, wherein said relative displacement amount reducing means includes means defining a second communication passage for establishing fluid communication between said fluid chambers, said second communication passage being smaller in cross-sectional area than said first communication passage.

11. A bushing type vibration insulator as claimed in claim 9, wherein said relative displacement amount reducing means includes first means for detecting amount of relative displacement between said outer and inner cylindrical members, second means for comparing the detected relative displacement amount with an allowable range of said relative displacement, and third means for closing said communication passage when the detected relative displacement amount is within said allowable range.

12. A bushing type vibration insulator which insulates vibrations in an automotive vehicle, comprising:
an outer cylindrical member;
an inner cylindrical member disposed inside and spaced from said outer cylindrical member;
an elastic member disposed between said outer and inner cylindrical members to connect said outer and inner cylindrical members;
means defining at least two fluid chambers filled with a fluid, said fluid chambers located between said outer and inner cylindrical members and separate from each other in peripheral direction of said outer and inner cylindrical members, said fluid chambers defining means including a part of said elastic member;
means defining a first communication passage for providing fluid communication between said fluid chambers;
an electrically operated actuator constructed and arranged to close said first communication passage to block fluid communication between said fluid chambers under a predetermined condition, said actuator being fixedly secured to said outer cylindrical member;
said actuator including a body in which a first portion of said first communication passage is formed, said body being fixedly secured to a part of said vibration insulator, and a spool constructed and arranged to close said first portion of said first communication passage in response to said predetermined condition;
said first portion of said first communication passage having first and second ends;
said first communication passage defining means including means defining a second portion of said first communication passage, formed through a wall of said outer cylindrical member and communicated with said one of the first and second ends of said first communication passage first portion, and means for defining a third portion of said first communication passage, formed between said outer and intermediate cylindrical members and communicated with one of said fluid chambers.

13. A bushing type vibration insulator which insulates vibrations in an automotive vehicle, comprising:
an outer cylindrical member;
an inner cylindrical member disposed inside and spaced from said outer cylindrical member;
an elastic member disposed between said outer and inner cylindrical members to connect said outer and inner cylindrical members;
means defining at least two fluid chambers filled with a fluid, said fluid chambers being located between said outer and inner cylindrical members and separate from each other in peripheral direction of said outer and inner cylindrical members, said fluid chambers defining means including a part of said elastic member;
means defining a first communication passage for providing fluid communication between said fluid chambers;
an electrically operated actuator constructed and arranged to close said first communication passage to block fluid communication between said fluid chambers under a predetermined condition, said actuator being fixedly secured to said outer cylindrical member;
said actuator including a body in which a first portion of said communication passage is formed, said body being fixedly secured to a part of said vibration insulator, and a spool constructed and arranged to close said first portion of said first communication passage in response to said predetermined condition;
further comprising a cylindrical bracket inside which said outer cylindrical member is fixedly secured;
said first portion of said communication passage having first and second ends;
said communication passage defining means including second and third portions of said communication passage, formed through a wall of said cylindrical bracket and respectively communicated with the first and second ends of said communication passage first portion, said third portion being communicated through said outer cylindrical member with one of said fluid chambers, and means for defining a fourth portion of said communication passage, formed between said cylindrical bracket and said outer cylindrical member, said fourth portion having first and second ends, said fourth portion first end being communicated with second portion, said fourth portion second end being communicated through said outer cylindrical member with another one of said fluid chambers.

14. A bushing type vibration insulator as claimed in claim 13, further comprising an O-ring disposed between said cylindrical bracket and said outer cylindrical member and located between said second and third portions of said communication passage.

15. A bushing type vibration insulator as claimed in claim 5, wherein said communication passage is formed through said inner cylindrical member, wherein said actuator spool is located within a bore of said inner cylindrical member and rotatable to close said communication passage first portion in response to said predetermined condition.

16. A bushing type vibration insulator as claimed in claim 5, where said spool is formed with a first through-opening which is capable of being coincident with said communication passage first portion to allow the fluid to flow through said communication passage first portion, said first through-opening being put out of said communication passage first portion to prevent the fluid from flowing through said communication passage first portion under a first predetermined condition.

17. A bushing type vibration insulator as claimed in claim 16, said spool is further formed with second through-opening which is capable of being coincident with said communication passage first portion, said second through-opening being put out of said communication passage first portion under a second predetermined condition, said second through-opening being smaller in cross-sectional area than said first through-hole.

18. A bushing type vibration insulator as claimed in claim 3, further comprising a cylindrical bracket inside which said outer cylindrical member is fixedly secured, wherein said intermediate cylindrical member is formed with a small diameter section to which an end section of said outer cylindrical member securely fit to form a space between a larger diameter section of said intermediate cylindrical member and said cylindrical bracket, a sealing material being disposed among said intermediate cylindrical member large diameter section, said outer cylindrical member and said cylindrical bracket.

19. A bushing type vibration insulator as claimed in claim 5, wherein said actuator body is fixedly secured to said outer cylindrical member.

20. A bushing type vibration insulator which insulates vibrations in an automotive vehicle, comprising:
an outer member;
an inner cylindrical member disposed inside and spaced from said outer cylindrical member;
an elastic member disposed between said outer and inner cylindrical members to connect said outer and inner cylindrical members;
means defining at least two fluid chambers filled with a fluid, said fluid chambers being located between said outer and inner cylindrical members and separate from each other in peripheral direction of said outer and inner cylindrical members, said fluid chambers defining means including a part of said elastic member;
means defining a first communication passage for providing fluid communication between said fluid chambers;
an electrically operated actuator constructed and arranged to close said first communication passage to block fluid communication between said fluid chambers under a predetermined condition, said actuator being fixedly secured to said outer cylindrical member;
said actuator including a body in which a first portion of said first communication passage is formed, said body being fixedly secured to a part of said vibration insulator, and a spool constructed and arranged to close said first portion of said first communication passage in response to said predetermined condition; and
further comprising a cylindrical bracket inside which said outer cylindrical member is fixedly secured, and a hollow rod fixedly secured to said cylindrical bracket, wherein said actuator body is disposed inside said rod and fixedly secured to said cylindrical bracket.

21. A bushing type vibration insulator as claimed in claim 11, wherein said first, second, and third sections of said relative displacement amount reducing means are incorporated as a unit to form a displacement sensor, said displacement sensor being fixedly secured to said actuator.

22. A bushing type vibration insulator as claimed in claim 1, wherein said at least two fluid chambers defining means includes means for defining two fluid chambers which are located diametrically opposite to each other.

23. A bushing type vibration insulator as claimed in claim 22, wherein said two fluid chambers are located symmetrical to each other with respect to said inner cylindrical member.

24. A bushing type vibration insulator which insulates vibrations in an automotive vehicle, comprising:
an outer cylindrical member;
an inner cylindrical member disposed inside and spaced from said outer cylindrical member;
said inner and outer cylindrical members sharing a common central longitudinal axis;
an elastic member disposed between said outer and inner cylindrical members to connect said outer and inner cylindrical members;
means defining at least two fluid chambers filled with a fluid, said fluid chambers being located between said outer and inner cylindrical members and separate from each other in peripheral direction of said outer and inner cylindrical members, said fluid chambers defining means including a part of said elastic member;
means defining a first communication passage for providing fluid communication between said fluid chambers;
an electrically operated actuator constructed and arranged to be put into a first state to close said first communication passage to block communication between said fluid chambers, and into a second state to open said first communication passage to establish the fluid communication, said actuator being fixedly secured directly to said outer cylindrical member; and means for putting said actuator into said first state during high speed cruising of the vehicle, and into said second state during rough road cruising of the vehicle.

25. A bushing type vibration insulator which insulates vibrations in a suspension of an automotive vehicle comprising:

an outer cylindrical member;

an inner cylindrical member disposed inside and spaced from said outer cylindrical member;

said inner and outer cylindrical members sharing a common central longitudinal axis;

an elastic member disposed between said outer and inner cylindrical members to connect said outer and inner cylindrical members;

means for transmitting vibration to cause relative displacement between said outer and inner cylindrical members through said elastic member;

means defining at least two fluid chambers filled with a fluid, said fluid chambers being located between said outer and inner cylindrical members and separate from each other in peripheral direction of said outer and inner cylindrical members, said fluid chambers defining means including a part of said elastic member;

means defining a first communication passage for providing fluid communication between said fluid chambers;

an electrically operated actuator constructed and arranged to be put into a first state to close said first communication passage to block fluid communication between said fluid chambers, and into a second state to open said first communication passage to establish the fluid communication, said actuator being fixedly secured directly to said outer cylindrical member; and means for putting said actuator into said first state during high speed cruising of the vehicle, and into said second state during rough road cruising of the vehicle.

26. A bushing type vibration insulator which insulates vibrations in an automotive vehicle, comprising:

an outer cylindrical member;

an inner cylindrical member disposed inside and spaced from said outer cylindrical member, said inner and outer cylindrical members sharing a common central longitudinal axis;

an elastic member disposed between said outer and inner cylindrical members;

means defining at least two fluid chambers filled with a fluid, said fluid chambers being located between said outer and inner cylindrical members and separate from each other in peripheral direction of said outer and inner cylindrical members, said fluid chambers defining means including a part of elastic member;

means defining a first communication passage for providing fluid communication between said fluid chambers; and an electrically operated actuator constructed and arranged to close said first communication passage to block fluid communication between said fluid chambers under a predetermined condition, said actuator being secured directly to said outer cylindrical member, said actuator including a body in which a first portion of said communication passage is formed, said body being fixedly secured to said outer cylindrical member, and an electrically operated and axially movable spool disposed in said body and adapted to close said first communication passage first portion in response to said predetermined condition.

* * * * *